United States Patent [19]

Nelson et al.

[11] Patent Number: 4,951,044

[45] Date of Patent: * Aug. 21, 1990

[54] PAGING TERMINAL APPARATUS WITH USER SELECTABLE PAGE FORWARDING CAPABILITY AND METHODOLOGY THEREFOR

[75] Inventors: Leonard E. Nelson, Boynton Beach; Philip P. Macnak, West Palm Beach, both of Fla.

[73] Assignee: Motorola, Inc., Schaumburg, Ill.

[ * ] Notice: The portion of the term of this patent subsequent to Mar. 21, 2006 has been disclaimed.

[21] Appl. No.: 326,700

[22] Filed: Mar. 21, 1989

[51] Int. Cl.$^5$ .............................................. H04B 7/00
[52] U.S. Cl. ............................. 340/825.44; 340/311.1; 455/31; 455/32
[58] Field of Search ....................... 340/825.44, 825.47, 340/311.1, 825.48; 379/56; 455/11, 31, 32, 38

[56] References Cited

U.S. PATENT DOCUMENTS

4,814,763  3/1989  Nelson et al. ................... 340/825.44
4,817,190  3/1989  Comroe et al. ........................ 455/11

Primary Examiner—Donald J. Yusko
Assistant Examiner—Dervis Magistre
Attorney, Agent, or Firm—Philip P. Macnak; Vincent B. Ingrassia; Anthony Sarli, Jr.

[57] ABSTRACT

A paging receiver having acknowledge back capability is provided with the capability to request a received message to be forwarded to an alternate paging receiver in a paging system after having received its address and associated message. The paging receiver includes an entry device for selecting the alternate paging receiver to which the message is further to be sent, and after the selection is made, the paging receiver generates the acknowledge back response requesting the message be further sent to the selected alternate paging receiver.

16 Claims, 10 Drawing Sheets

PAGING TERMINAL APPARATUS WITH USER SELECTABLE PAGE FORWARDING CAPABILITY AND METHODOLOGY THEREFOR

BACKGROUND OF THE INVENTION

The present invention relates generally to paging systems and, more particularly, to paging terminal apparatus which, in cooperation with paging receivers with acknowledge back capability, provides selective page forwarding service at the election of the pager user.

Present day paging systems are efficient, sophisticated in technology and serve well large numbers of users. As a result, such systems are relied upon more and more to reach particular individuals wearing such paging receivers to deliver critical and urgent messages. Unfortunately, it cannot always be guaranteed that such messages for particular pagers will in fact be received when initially sent as intended. In the past, paging messages were sent without knowing whether users received them as intended or not. One way to overcome this, of course, has been to provide the paging receivers themselves with an acknowledge back capability which is activated, either manually or automatically, whenever their particular address is received and properly decoded. This assures that the pager is working satisfactorily and that the message originator may be notified with a good deal of confidence that the message was very probably received as intended. No specific action on the part of the pager user was necessarily required.

The above, of course, provided a substantial step towards assuring confidence in the reliability of the paging system. However, it did not address the problem regarding those instances in which acknowledge back is not perfected. It will readily be understood that the pager may be inoperative, the user may be out of effective signal range, or the pager may have been, accidentally or intentionally, turned off. Nevertheless, there are instances in which it is deemed imperative that the intended pager user be reached in one way or another. In still other instances, the pager user may receive, as intended, an important message that requires immediate action, but the pager user may be unable to respond himself and wish to alert some other member of his organization or staff to handle the situation. This usually requires that the pager user to interrupt whatever he is doing; for instance, negotiations with a valued client, and send a page to this other staff member by re-entering the message. This can be annoying and very disruptive to the pager user.

A solution to the problem of handling a message intended for a paging receiver which fails to acknowledge back is described in U.S. Pat. No. 4,814,763 issued Mar. 21, 1989 to Nelson et al. entitled "Paging Terminal Apparatus with Page Forwarding Capability and Methodology Thereof." The paging terminal stores a set hierarchy listing of alternate pagers in the system which is used by the terminal to forward messages when a pager fails to acknowledge. An approach to the problem of redirecting received messages is also described in another embodiment of the same invention. In this embodiment, a method for use with pagers having multiple acknowledge back capability is described, whereby the specific acknowledge back response sent by the pager user after receiving a message can be a request to forward the message to another pager user based upon the same set hierarchy listing of alternate pager addresses stored in the terminal.

While terminal directed message forwarding is a large improvement over the prior art, there are instances when the hierarchy listing stored in the terminal apparatus does not include a pager or pagers to which the pager user may wish to forward his just received message. In addition, the hierarchal listing stored in the terminal apparatus cannot be easily changed by the pager user. Usually, the pager user will have to contact the paging service provider or paging system manager to have this listing modified. A message forwarding method is needed that allows the pager user to forward his received messages to any other valid pager user independent of and without impacting the regular terminal hierarchal directed message forwarding, as well as allow the pager user to easily modify his directory of forwarding addresses.

A more convenient and flexible arrangement is therefore needed which will allow a pager user, upon receipt of a message, to direct the forwarding of that same message to any valid pager user of the system.

SUMMARY OF THE INVENTION

Accordingly, it is an object of the present invention to overcome the deficiencies of the prior art paging systems n effecting the forwarding of pager messages by pager users.

A more particular object of the present invention is to provide appropriate methodology and apparatus for effecting user selectable paging forwarding in a paging system with paging receivers having acknowledge back capability which is independent of a predetermined page forwarding hierarchy.

In practicing the invention, paging terminal apparatus is provided for use with paging receivers having an acknowledge back capability, wherein paging messages intended for a particular called pager can be forwarded by the paging terminal apparatus upon request of the called pager user to another pager within the system which is not included in a predetermined set hierarchy list stored in the paging terminal apparatus. The other pager to whom the message is redirected is determined by the paging user from a predetermined list of alternate pager addresses which are stored in the pager and thus easily modified by the pager user, or which can be manually entered by the user into the pager.

BRIEF DESCRIPTION OF THE DRAWINGS

The features of the present invention which are believed to be novel are set forth with particularity in the appended claims. The invention itself, however, together with further objects and advantage thereof, may best be understood by reference to the accompanying drawings, in which

BRIEF DESCRIPTION OF THE PREFERRED EMBODIMENT

Figure 1:
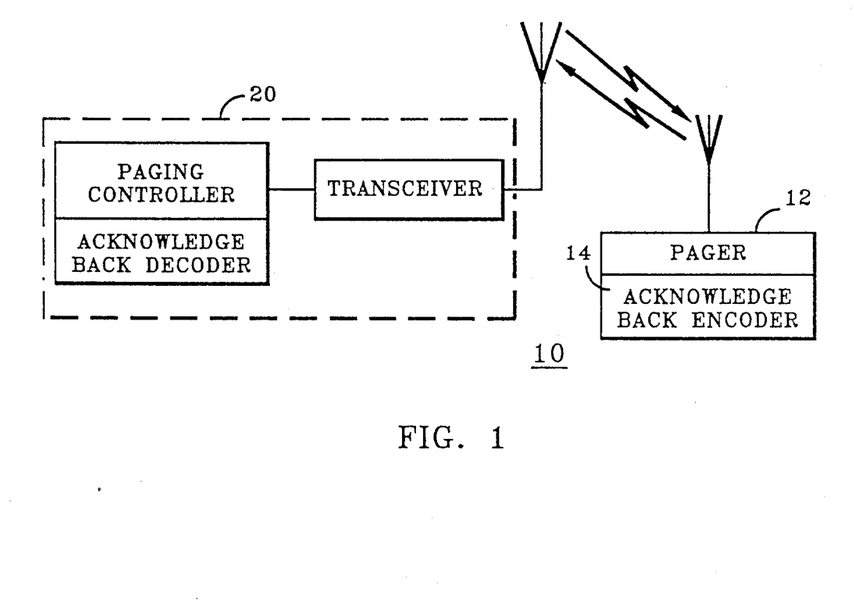
FIG. 1 is a block diagram of a radio communication system in which one aspect of the present invention may be advantageously utilized.

Referring now to the drawings, a radio communications paging system 10 is shown in FIG. 1 in which the present invention may be advantageously utilized. The paging system 10 includes terminal apparatus, shown generally at reference 20, and a plurality of paging receivers, indicated at 12, as illustrated. It is intended that the associated paging receivers be capable of and provide an acknowledge back feature upon receiving and recognizing certain transmitted information. Pagers of this character are, of course, known in the art and include an acknowledge back encoder 14 as indicated for activation, manually or automatically, when the paging receiver 12 receives and recognizes at least its particular address. A more detailed description will be set forth in connection with FIG. 3 for the system pager function and operation.

Figure 2:
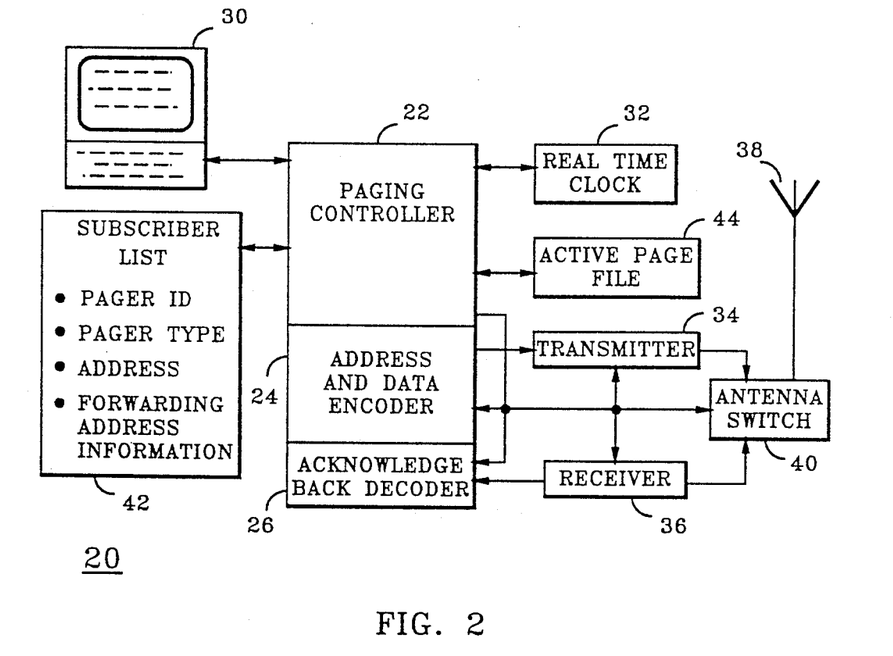
FIG. 2 is a block diagram of a paging terminal and associated apparatus used to send addresses and messages to the system pagers and which include the automatic and/or selective call forwarding feature of the present invention.

The terminal apparatus 20 of FIG. 1 is illustrated in greater detail in FIG. 2 together with the associated auxiliary equipment and the paging files intended to be generated and maintained to effect the advantages of the present invention. As therein shown, terminal apparatus 20 includes a paging controller 22 which also includes an address and data encoder 24 and an acknowledge back decoder 26. Associated with the paging controller is an entry device 30, a real time clock 32 as well as a transmitter 34 and receiver 36 operating in connection with an antenna 38 and an antenna switch 40. Although a switch is shown as 40, a duplexer may also be used. A duplexer is a transmission line device which permits the use of a single antenna for simultaneous transmission and reception. The use of a duplexer for simultaneous transmission and reception of information is well known to those of ordinary skill in the art.

Entry device 30 is used to access the paging controller 22 to enter pager ID's (identification numbers) and messages intended therefor for subsequent transmission. The entry device 30 as shown is a video display terminal which is useful for entering alphanumeric messages, and for accessing and updating a subscriber list 42. Subscriber list 42 is a list of all the pagers ID's that are valid in the system 10. Filed under each pager ID in the subscriber list 42 are several items that will be needed by the paging controller 22 to send, or transmit, a page including such information as pager type (acknowledge back or non-acknowledge back), the particular pager address which corresponds to the pager ID, as well as a particular forwarding address hierarchy, for use with pagers which initially fail to acknowledge back. The use of the forwarding address hierarchy stored in the terminal is described in U.S. Pat. No. 4,814,763, issued Mar. 21, 1989, to Nelson et al. entitled "Paging Terminal Apparatus with Page Forwarding Capability and Methodology Thereof" which is assigned to the assignee of the present invention and which is incorporated by reference herein.

As may be appreciated, paging controller 22 is the essential heart of the system 10 and controls the operation of the other associated elements of the paging terminal apparatus. In addition to subscriber list 42, maintained by controller 22, an active page file 44 is also maintained and comprises a temporary file containing information about the pages being processed by the terminal apparatus 20. The active page file 44 includes at least the pager identification or ID, address, message, time, and may include whether the originator is to be notified of the received acknowledgment. A real time clock 32 is used to supply timing information to the paging controller and for time stamping of the messages in the active page file 44.

The address and data encoder 24 accepts addresses and messages supplied to the paging controller 22 by the entry device 30. Address and data encoder 22 then converts this supplied information to the actual transmitted bit pattern in a manner well understood by those skilled in the art. These bit patterns are subsequently transmitted by transmitter 34 through antenna switch 40 to antenna 38 which radiates the signal energy to the system pagers 12. The "Ack-Back" decoder 26 then detects and processes any acknowledgments returned by the system pagers 12 and provides this information to the paging controller 22. Transmitter 34 modulates an RF carrier frequency with outbound addresses and messages, and receiver 36 demodulates the inbound modulated RF carrier frequency and supplies recovered data to decoder 26.

Upon transmitting an address and an intended message for a particular pager 12, an acknowledgment is sent back by that pager and received by paging controller 22. If an address and message for a particular paging receiver 12 is transmitted and an acknowledgment back is not received within a predetermined period of time, the message intended for that particular receiver 12 may be forwarded to another pager within the system. The identity of that other pager is determined by the terminal apparatus from a set hierarchy of alternate pagers as entered into the subscriber list 42 as associated with the initial pager failing to acknowledge back as described in U.S. Pat. No. 4,814,763, issued to Nelson et al. Otherwise, in accordance with the present invention, the acknowledge back response is processed to determine if a user selected page forward request has been generated, as will be described in detail shortly.

Figure 3:
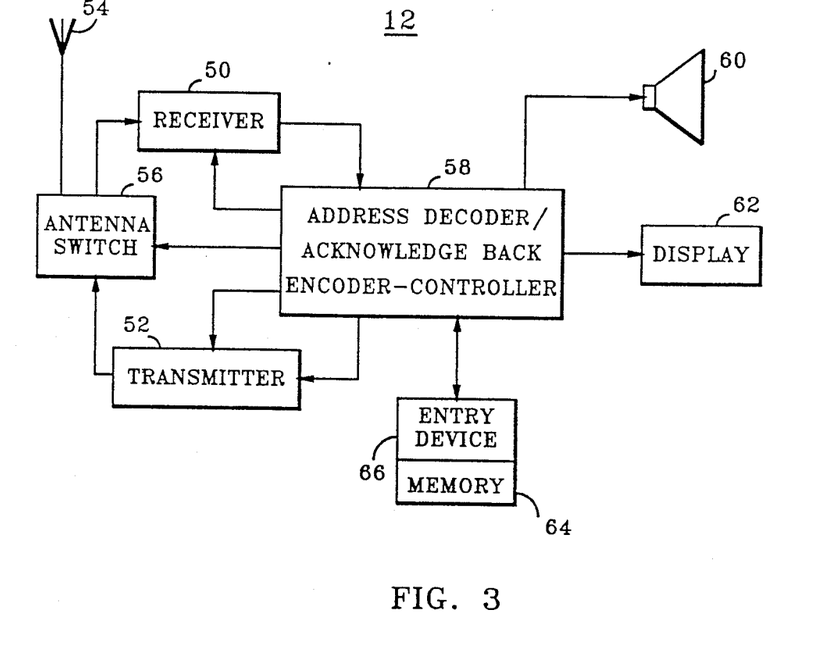
FIG. 3 is a block diagram of a paging receiver with acknowledge back capability intended for operation in the preferred embodiment of the present invention.
Figure 4:
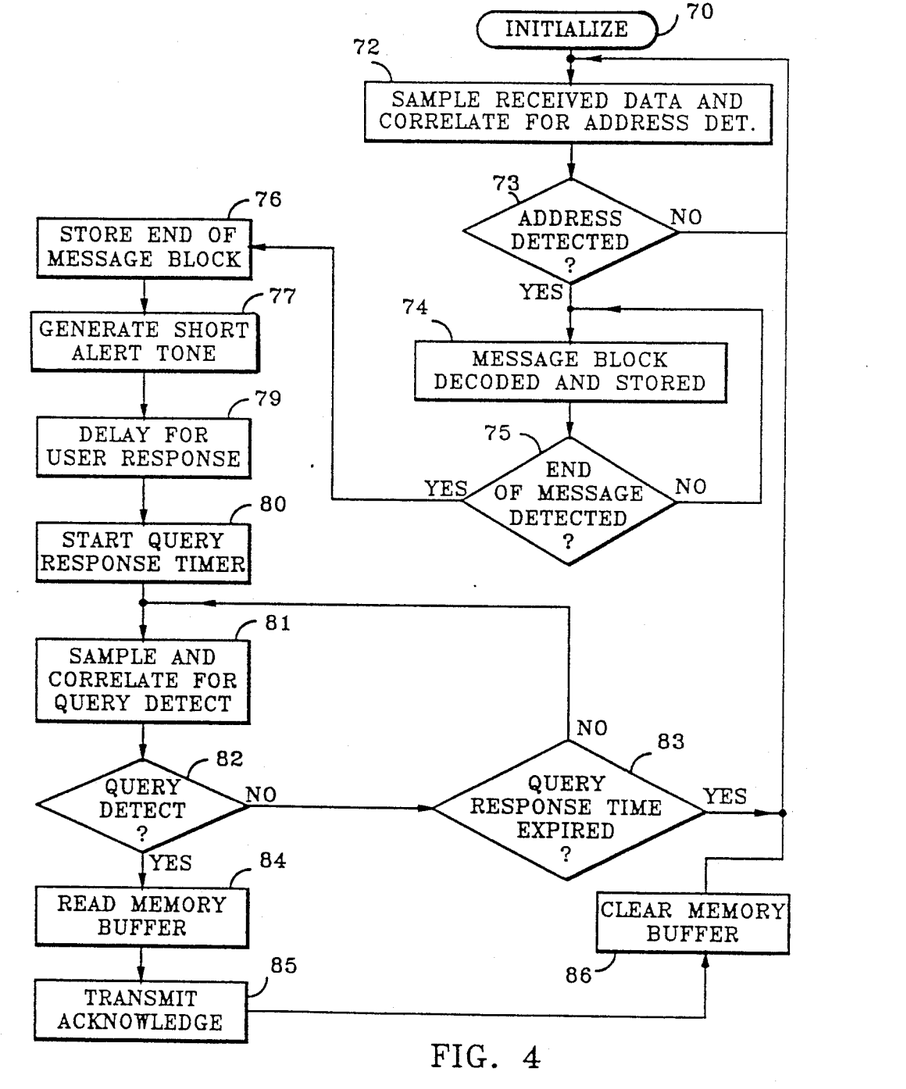
FIG. 4 is a flow chart which describes the operation of the paging receiver of FIG. 3.

The block diagram of the paging receiver 12 is shown in FIG. 3 and a flow diagram that describes its operation is illustrated in FIG. 4. Referring now to FIG. 3, the pager 12 with acknowledge back capability (hereinafter "Ack-Back"), as illustrated, consists of a receiver section 50 and a transmitter section 52. RF signals are coupled to and from the receiver and transmitter sections 50/52 via an antenna 54 and antenna switch 56. Normally, ack-back pager 12 is operated in the receive mode, and the demodulated data output of the receiver section 50 is coupled to an included paging address decoder 58. In addition, entry device 66 having memory 64 is coupled to address decoder/acknowledge back encoder 58 providing the user the opportunity to selectably forward a received message to an alternate system pager.

As indicated in the flow chart of FIG. 4, following the initialize step 70, the address decoder 58 examines the recovered data looking for a unique selective calling signal or address at steps 72 and 73 that is assigned to pager 12. This unique address is a precursor for any numeric, alphanumeric or voice messages that may be directed to the pager. Once the address has been detected at step 73, the paging address decoder 58 performs appropriate message decoding on the data that follows the address.

The message decoding itself is performed in program flow steps 74 through 76 in the conventional manner understood by those skilled in the art and it is deemed unnecessary to describe the same in further detail at this point for that reason and, further, because it is not a critical matter to an understanding of the present invention. Once a complete message has been received, the paging decoder 58 generates an alert tone and routes this alert tone to the receiver transducer 60. The paging decoder 58 also stores the messages in memory so that a pager wearer can recall these messages later for viewing on display 62 in the usual manner.

The pager user at step 79 is given the opportunity through entry device 66 to enter an ack-back response, or select a predefined ack-back response for storage in an ack-back response buffer. The selection and entry procedure will be more fully described shortly in connection with FIG. 5. The decoder 58, after a short delay, looks for a query signal transmitted by terminal apparatus 20.

If the pager user enters an ack-back response before the query signal, sent by terminal apparatus 20, is detected, the paging decoder 58 will, upon such detection at step 82, read the ack-back response from the memory buffer, step 84, key the transmitter 52, modulate it with the ack-back response signal, and direct the transmit output signal to the antenna 54 through antenna switch 56. It is to be understood that if the message is not received by the pager user or such user elects not to acknowledge back, no ack-back response will be generated and the message will be forwarded by the terminal apparatus 20 as described in the aforementioned U.S. Pat. No. 4,814,763. After transmission of the ack-back response at step 85, the memory buffer is cleared at step 86.

Figure 5:
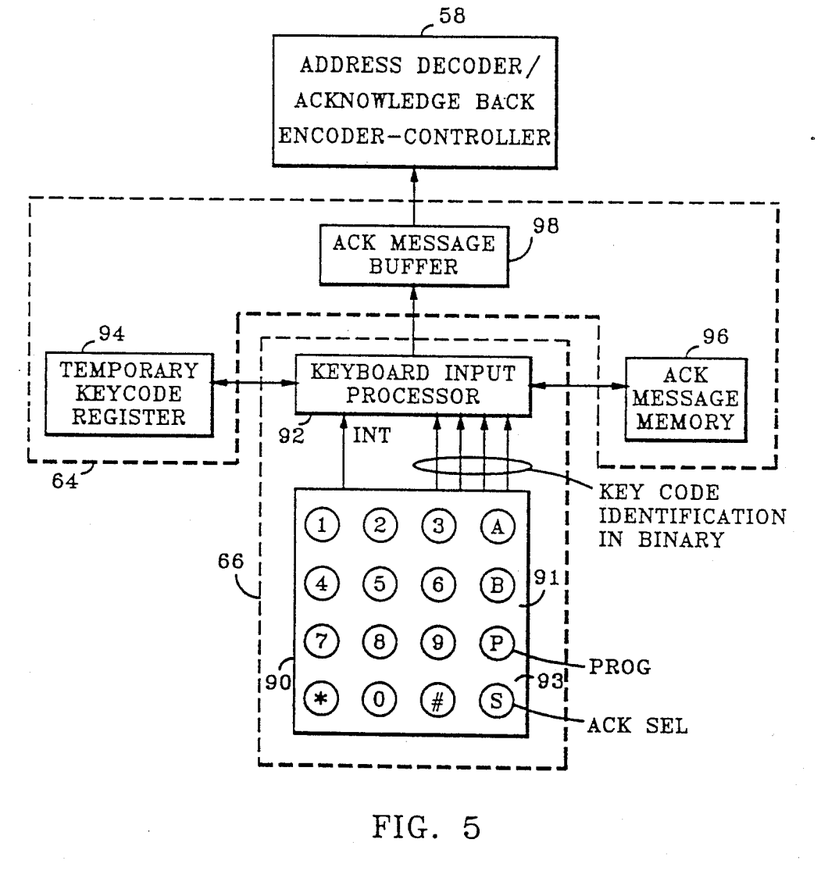
FIG. 5 is a block diagram of the apparatus providing user selectable page forwarding.

FIG. 5 shows an electrical block diagram of the apparatus which, when added to ack-back pager 12, provides the user selectable message forwarding capability. The apparatus includes an acknowledge response selector means, such a entry device 66 which provides the pager user with the ability to enter and/or select a forwarding address to which the currently received message may be forwarded and which is to be sent as part of the acknowledge back response when the pager is queried by the paging terminal. Selector means 66 includes a user entry means including keyboard 90 for entering the address of an alternate paging receiver, or for selecting the address of an alternate paging receiver from a predetermined list stored in ack message memory 96. In the preferred embodiment of the present invention, keyboard 90 may be implemented with a conventional four by four keypad providing a binary keycode identification output. Keyboard 90 allows the user to enter or select alternate system paging receiver addresses using the number keys 0 through 9, and using either the "program" key 91 or the acknowledge selector key 93, hereinafter referred to as the "ack-sel" key. It will be appreciated that other keyboard configurations, such as a twelve key "telephone" type keyboard may also be utilized to provide the address entry and selection. It will also be appreciated, when only a single alternate system paging receiver is provided for user selectable message forwarding, the keyboard entry means may be replaced by a single switch entry means.

The binary keycode identification output from keyboard 90 is processed by keyboard input processor 92. Keyboard processor 92 may be implemented using a microcomputer, such as an MC68HC05C4 microcomputer manufactured by Motorola, Inc. When an address is being entered through keyboard 90, the address information is initially stored in temporary keycode register 94. The temporary keycode register 94 may be implemented using a portion of the internal RAM memory available in the MC68HC05C4 microcomputer used as the keyboard processor. Once the complete address has been entered, the address may be stored in ack message memory 96 or ack message buffer 98 using the program key 91 in a manner to be described shortly. This allows the pager user the ability to readily program, or reprogram, the contents of the ack message memory 96, thereby providing a memory means having a predetermined list of the most common alternate pager addresses to which the user may wish to forward his current messages. The ack message memory 96 may be implemented using any of a variety memory circuits, such as an electrically erasable programmable read only memory (EEPROM) which allows reprogramming of the memory in the pager by the user and non-volatile storage of the forwarding addresses during periods when the pager is switched off, such as at night.

The alternate address entered into the temporary keycode memory 94 may also be loaded directly into the ack message buffer 98 to provide a one-time selection of an alternate paging receiver to which the current message is to be forwarded using program key 91. This provides the user additional flexibility in selecting an alternate paging receiver for forwarding messages. Alternate paging receive addresses stored in the ack message memory 96 may also be recalled and stored in the ack message buffer 98 using ack-sel key 93 in a manner to be described shortly. The ack message buffer may be implemented using any of a number of readily available parallel input/parallel output latched flip-flop buffers.

Figure 6A:
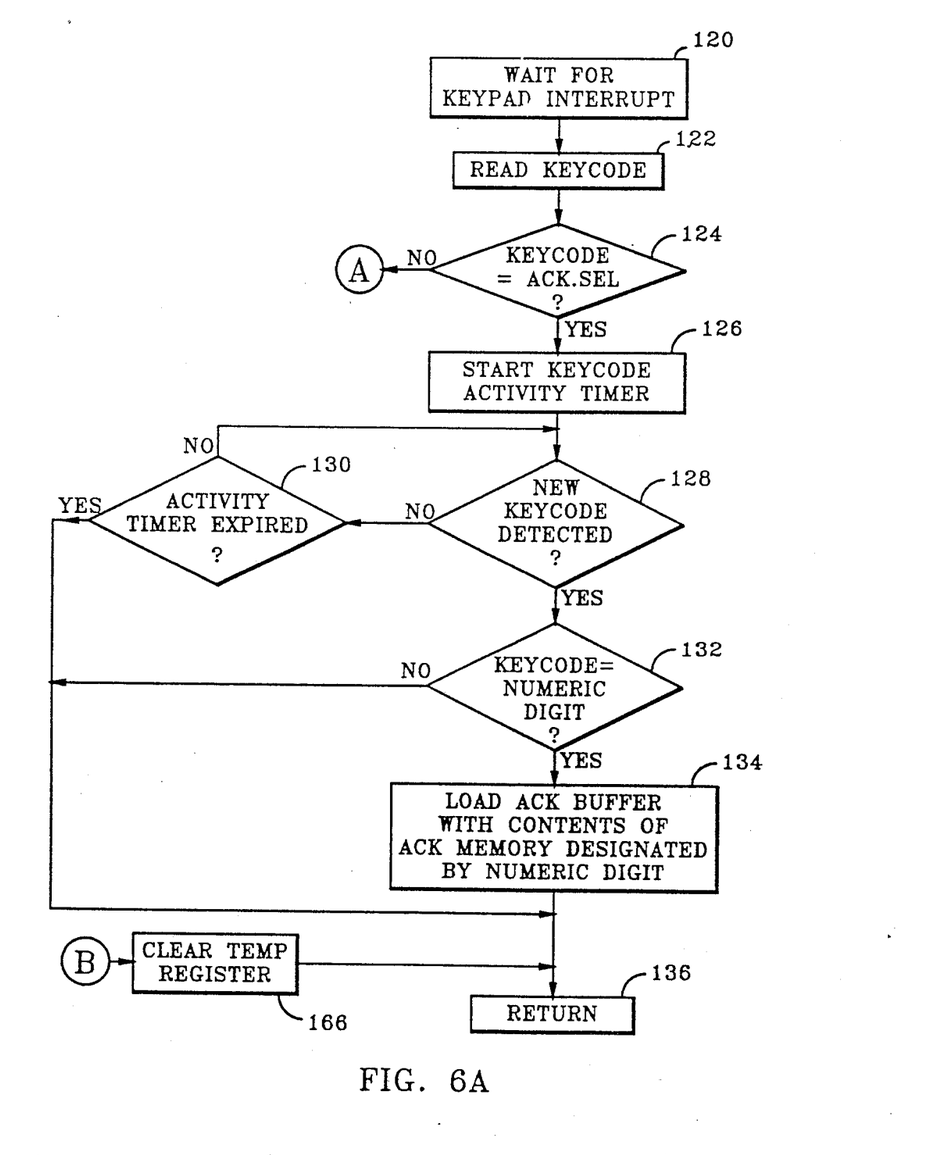
FIGS. 6A and 6B are flow diagrams that describe the operation of the apparatus providing user selectable page forwarding.
Figure 6B:
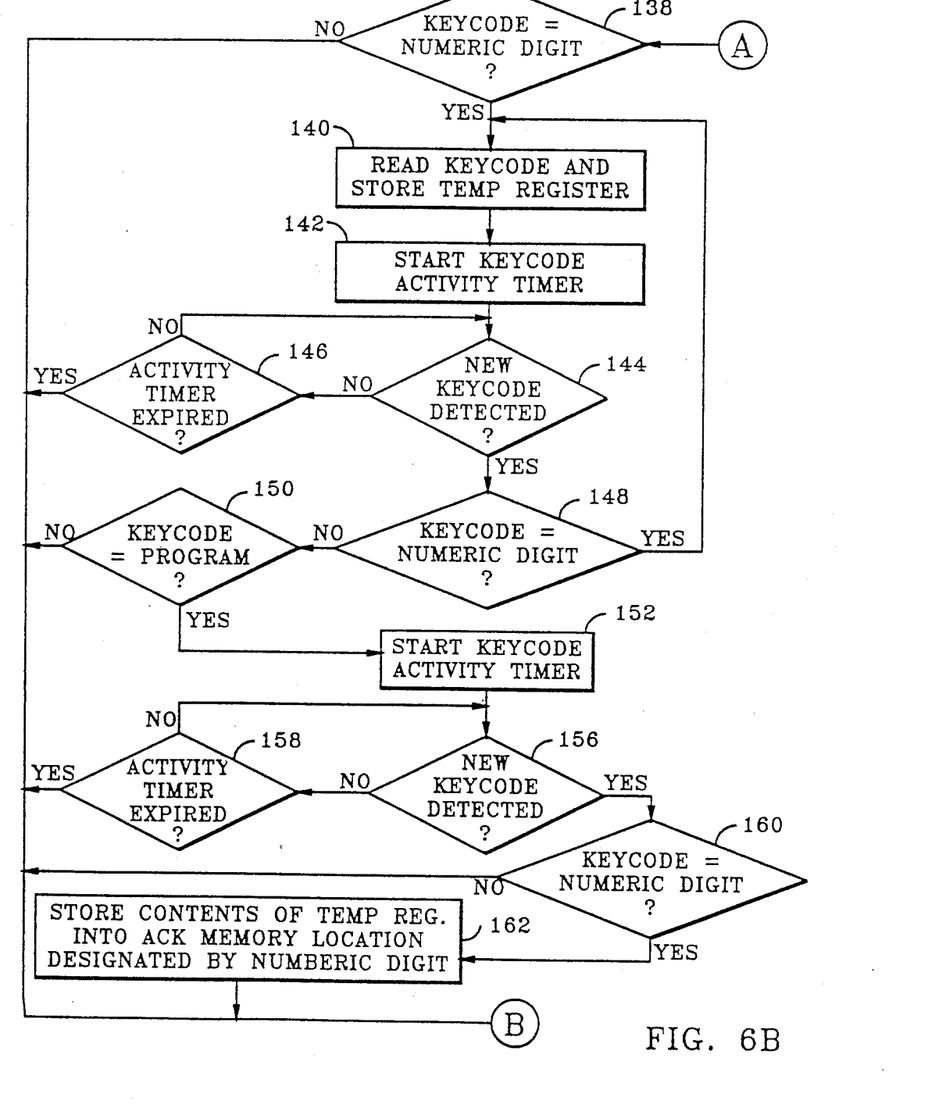

The operation of the acknowledge selector means 66 is described in the flow chart of FIGS. 6A and 6B. Referring to FIG. 6A, keyboard input processor 92 normally is monitoring the output of keyboard 90. When an interrupt signal is generated at step 120, which occurs when any of the keys are actuated, the processor reads the keycode, at step 122. When the keycode designates the ack-sel key, at step 124, a keycode activity timer is started, at step 126. The processor continues to monitor the keyboard output checking for the entry of a new keycode, at step 128. The processor continues to monitor the keyboard until the activity timer times out, at step 130, or until a numeric key is actuated, at step 132. When the activity timer times out, at step 130, the processor returns, at step 136, to step 120 to wait for the next keyboard entry. Should a key other than a numeric key be actuated at step 132, the processor also returns, at step 136, to step 120 to wait for the next keyboard entry. When a numeric key is actuated, at step 132, the ack memory buffer 98 is loaded with the contents of the ack message memory 96 which is designated by the numeric digit, at step 134. In this manner, up to nine predetermined addresses may be recalled from the ack message memory 96 using the number keys 1–9. The number of addresses which can be recalled is described for example only, and fewer or greater numbers may be recalled by restricting the number of functional numeric keys, or providing additional keys, or keystrokes for memory selection, as is well known in the art. Actuation of the ack-sel key followed by a numeric 0 is a special case because register 0 is the ack message buffer 98. The "ack-sel 0" will result in the generation of an ack response which will include in its transmission the current contents of the ack message buffer 98. Usually, this will result in the transmission of a simple ack, since the buffer is cleared after every ack transmission, and an all 0's ack when received by the paging terminal is interpreted as a simple ack with no forwarding requested. However, the ack buffer can be loaded with the contents of the temporary key code register 94 using the program key to be described shortly. In this instance, an "ack-sel 0" would result in the generation of an ack response that would include in its transmission the contents of the recently programmed ack message buffer typically the forwarding address of a pager not currently stored in the ack message memory 96. This provides additional flexibility in forwarding of messages.

When the ack-sel key was not actuated, at step 124, the processor determines which other key was actuated, at step 138 in FIG. 6B. When a key other than a numeric key is depressed, at step 138, the processor clears the contents of the temporary keycode register, at step 166 of FIG. 6A and then the processor returns, at step 136, to step 120 to wait for the next keyboard entry.

Returning to FIG. 6B, when a numeric key is actuated, at step 138, the processor reads the keycode and stores the result in the temporary keycode register 94, at step 140. The keycode activity timer is started at step 142, and the processor waits for a new key to be actuated, at step 144. When activity time timer expires before a new key is actuated, at step 146, the processor clears the contents of the temporary keycode register, at step 166 of FIG. 6A and then the processor returns, at step 136, to step 120 to wait for the next keyboard entry. The activity timer, in the preferred embodiment, is set to a period of time such as fifteen seconds, which provides sufficient time between keystrokes to enter a new number. Should the user exceed this time limit, it was probably because the user was distracted or unintentionally actuated a numeric key.

Returning to FIG. 6B, when the next key actuation is made, at step 144, the processor determines if the keycode is a numeric key, at step 148. The processor then reads the keycode and stores the digit in the temporary keycode register 94, at step 140. When a key other than a numeric digit is actuated, at step 148, the processor checks to determine if the program key was actuated. When the program key was not actuated, at step 150, and input error occurred, and the processor clears the contents of the temporary keycode register, at step 166 of FIG. 6A and then the processor returns, at step 136, to step 120 to wait for the next keyboard entry.

Returning to FIG. 6B, when the program key was actuated, at step 150, the keycode activity timer is again started, at step 152. When a new keycode is not detected, at step 156, and the activity timer has timed out, at step 158, the processor again clears the contents of the temporary keycode register, at step 166 of FIG. 6A and then the processor returns, at step 136, to step 120 to wait for the next keyboard entry.

Returning to FIG. 6B, when a numeric key is actuated, at step 160, the processor determines which key was actuated, and stores the contents of the temporary keycode register 94 into the ack message memory 96 designated by the numeric digit, at step 162. As previously described, addresses are stored in the ack message memory 96 corresponding to numeric keys 1 through 9. In the preferred embodiment of the present invention, key 0 corresponds to the ack message buffer 98, thereby allowing the user to directly enter an address for forwarding messages to alternate system paging receivers.

Figure 7:
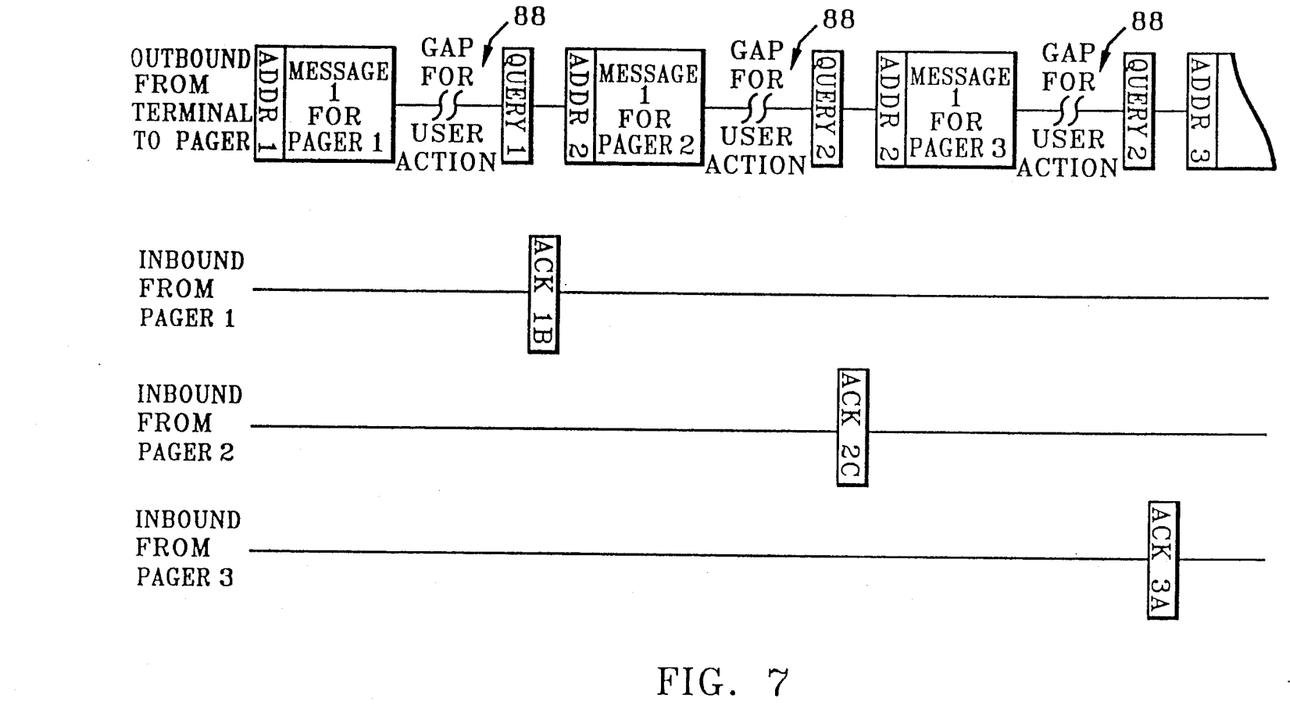
FIG. 7 is a graphic representation of the timing diagram showing the relationship between pager operation for user selectable page forwarding.

FIG. 7 references the various relationships that may be expected between "outbound" terminal signals and "inbound" signals from the system pagers. Illustrated is an example of these messages sent to those pagers which all duly acknowledged back. When the user actuates the ack-sel key followed by a number 0 on keyboard 90, a simple acknowledge back with no call forwarding request is generated. Similarly, additional responses associated with the ack-sel key followed by any other numbered key 1-9 on keyboard 90 will generate a request to forward the message to some additional predetermined pager user as determined from the address transmitted in the acknowledge back response.

In the example given, the acknowledge back from pager no. 1 contains a request to forward the referenced message to some other pager user (in this example, pager no. 2). The forwarding address for pager no. 2 being determined from the acknowledge back response received from pager no. 1, and thus the message for pager no. 1 is also sent to pager no. 2 who acknowledges back and also requests the referenced message to also be forwarded to still another pager user (in this example, pager no. 3). The controller 20 then determines the address of that still other pager user (pager no. 3) from the acknowledge back response received from pager no. 2 and sends out that address and the message for pager no. 1 to pager no. 3 who, in the example, makes a simple acknowledge back response with no request to forward.

The acknowledge back signal shown in FIG. 7 sent from the pager to the paging terminal apparatus in response to the query signal is made up of two parts of an Ack-Code portion followed by an Ack Message portion. The ack-code provides the necessary information to enable the acknowledge back decoder to synchronize to the ack-back signal received from the pager, to identify the source of the response signal, and to establish synchronization for decoding the subsequent ack message in a manner well known to those skilled in the art. The ack-back code could, for instance, be the address of the pager responding to the acknowledge back query request, although many other arrangements are possible.

The ack message portion of the acknowledge back signal contains at least the address of the pager to which the message is to be redirected. This address may be in the form of a 4 to 7 digit telephone number which is the usual manner of initiating a page, and further this arrangement allows the paging terminal to treat the forwarding request as just another page. An ack message portion consisting of all 0's indicates a simple ack response with no forwarding request.

The means and the procedure for effecting the signalling procedure, as illustrated and described in FIG. 7, are accomplished within, and by means of, the paging controller 22 of terminal apparatus 20 as previously described. The procedure/protocol for accomplishing this is set forth with particularity in the flow diagram comprising FIGS. 8A and 8B. The operation begins in FIG. 8A initialize step 90, normally needed only at power up. Step 90 is used to perform functions such as setting up the I/O ports as inputs and outputs, clearing certain memory locations, and perhaps running a self-test.

Figure 8A:
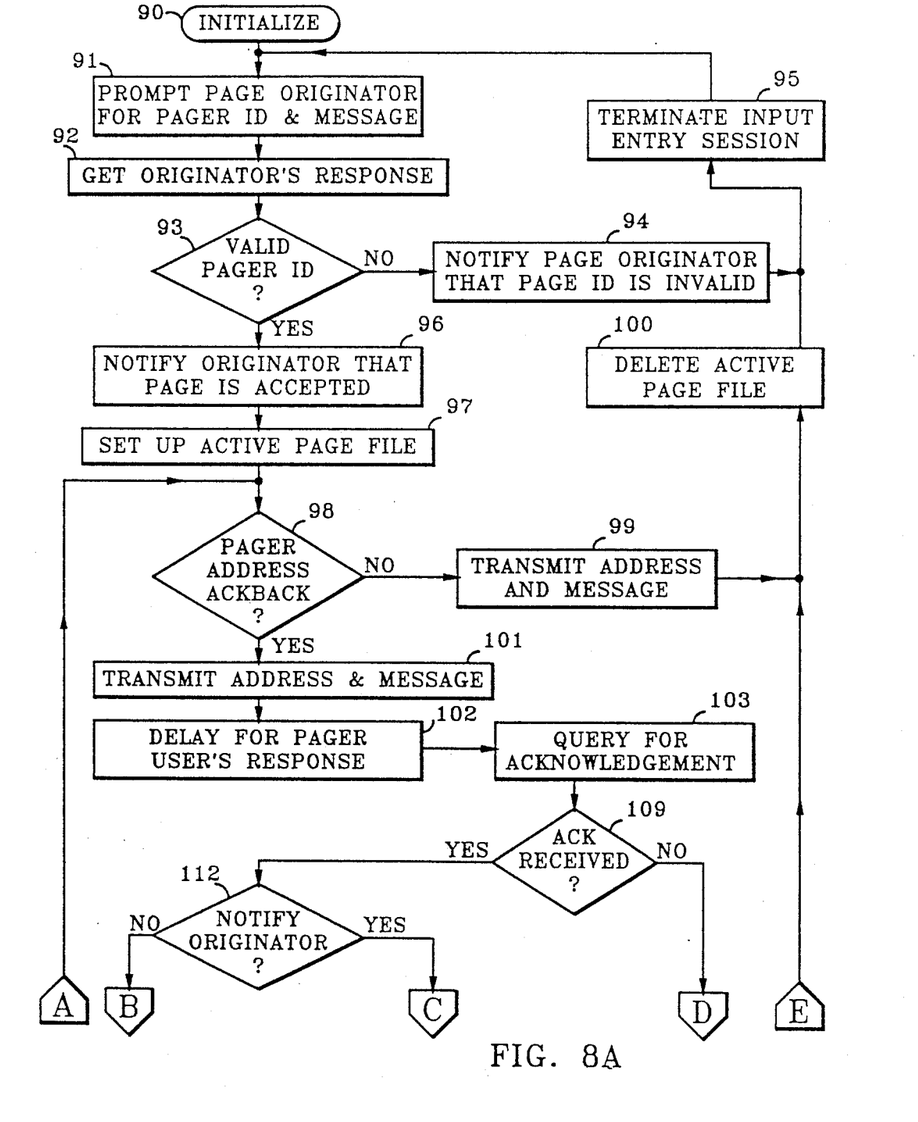
FIGS. 8A and 8B are flow diagrams that describe the operation of the paging terminal including the handling and forwarding of paging messages in accordance with the preferred embodiment of the present invention.

After completing the initial power up routine, paging controller 22 then prompts the page originator at step 91 for a pager ID and message which may be entered by way of entry device 30, and then actuating a designated key (such as enter) on device 30. Paging controller 22 then reads the originator's response at step 92 and looks for a matching pager ID in the subscriber list 42 at step 93. If there is no matching ID, the controller 22 sends a message to entry device 30 at step 94 notifying the originator that the pager ID entered is invalid and the input session is terminated at step 95, whereupon paging controller 22 is returned to step 91 as illustrated. If a matching ID is found at step 93, a message is sent to entry device 30 notifying the page originator that the page has in fact been accepted, at step 96.

Once the page has been accepted by controller 22, it then sets up active page file 44 at step 97 which contains the pager's ID, the address of the pager to which the page will be sent, and the message associated with the page. The address corresponding to a particular pager's ID is located in subscriber list 42. A pager's address and ID may be identical, but generally they are not. Typically, a pager has a four to seven digit pager ID, but an address is perhaps six or seven digits in length.

Next, the controller 22 consults subscriber list 42 at step 98 to determine if the pager being addressed is capable of an acknowledge back feature. If the pager being addressed is not one capable of such, the page is sent immediately at step 99, whereupon the active page file entry 44 is deleted at step 100, and paging controller 22 is returned to step 91 in the flow diagram, as illustrated.

If the pager being addressed is capable of acknowledging back, the address and message are transmitted at step 101. In performing the operations indicated at steps 99 and 10, paging controller 22 may, for example, send information in the form of ASCII characters to the address and data encoder 24 where it is converted to the required binary digits, and parity information is added before being applied to transmitter 34 for transmission.

Following step 101, pager controller 22 waits for a minimum length of time at step 102 to allow the pager user to read the message and acknowledge back by entering a keycode combination on keyboard 90. The response signal is not sent immediately by the pager, as mentioned previously, but rather, the pager waits until a query signal is received from the terminal apparatus 22 at step 103. After the query signal is sent by pager controller 22, it turns transmitter 34 off, enables receiver 36, connects antenna 38 to receiver 36 via antenna switch 40, and enables ack-back decoder 26 for a brief window. If the ack-back response is not detected, the active page file is consulted at step 110 to see if an ack to originator is required. This step is necessary since the page originator has no control over whether a page will be selectively forwarded, and he is normally only interested to know that the page was received by the original addressee. If the page originator is to be notified, a message is sent to the entry device at step 111 notifying the page originator that the page was not acknowledged, and then the active page file is deleted at step 100, and the input session is terminated at step 95. If the originator is not to be notified (in the case of a forwarded page), the active page file is deleted at step 100, and the program flow returns to the input prompt state.

If the page is acknowledged at step 109, the active page file is consulted at step 112 to see if the originator should be notified. Referring now to FIG. 8A, if the originator is to be notified, a message is sent to the entry device at step 113 notifying the originator that the message was acknowledged. If this is a forwarded page, the program branches around step 113 to step 114.

Figure 8B:
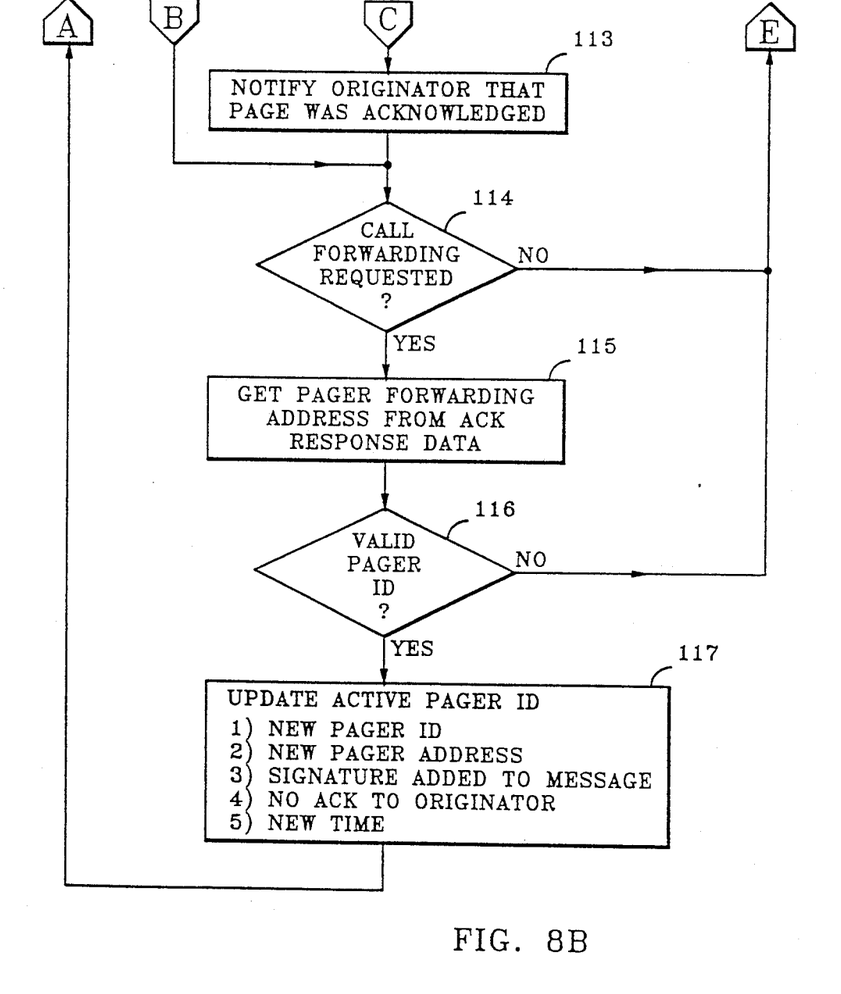

After a page acknowledgement has been received and proper notification has been made to the originator, the nature of the acknowledgment is determined at step 114. Ack's can be simple acknowledgments as well as forwarding requests. If the acknowledgment is only a simple ack, the active page file will be deleted at step 100 and the program flow returned to the input prompt state. However, if there is a forwarding request contained in the acknowledgment, the paging controller determines a forwarding address from the acknowledge response at step 115, and at step 116, the controller checks to see whether the forwarding address is a valid address in the system. If the forwarding address is not a valid address, the active page file will be deleted at step 100 and the program flow returned to the input prompt state. However, if the forwarding address is a valid address, the controller, at step 117, updates the active page file with a new pager ID, a new address, and a signature is added to the message indicating that the message was forwarded from the original addressee. This signature could be the name associated with the pager's ID contained in the subscriber list. In addition, a no ack to the originator is specified. After updating of the active page file, the program returns to step 98. A forwarded message is essentially just another page to the paging controller; however, a signature is added to the message each time it is forwarded.

In this manner, then, a procedure is established whereby the normal paging operations proceed in the manner well known in prior systems. However, pager users are given the opportunity to redirect their received messages to other system users without having to re-enter the message or make a phone call.

Further, this page forward operation is entirely under the control of the pager user. The pager user can enter and modify a list of common forwarding addresses stored in memory within the paging receiver. The pager user can select a forwarding address from this predefined list, or enter any valid system pager address for use in forwarding a recently received message. The forwarding addresses are sent with the acknowledge back response signal. In this way, a convenient and flexible arrangement is provided for pager users to effectively and efficiently redirect received paging messages to any valid system user.

What is claimed is:

1. A paging receiver having acknowledge back capability for providing to a user the capability to select any one of a plurality of alternate paging receivers operating in a paging system to which a received message may be further forwarded, said paging receiver comprising:
   means for receiving addresses and associated messages that are directed to the paging receiver and transmitted in the paging system;
   means for selecting by the user the alternate paging receiver to which the received message is further to be sent; and means for generating an acknowledge back response identifying the selected alternate paging receiver to which the received message is further to be sent.

2. The paging receiver according to claim 1 wherein said means for selecting further comprises memory means for storing a predetermined list of addresses identifying the alternate paging receivers to which the received messages can be further sent.

3. The paging receiver according to claim 2 wherein said memory means is a programmable read only memory.

4. The paging receiver according to claim 2 wherein said means for selecting further comprises user entry means for selecting the alternate paging receivers from the predetermined list of addresses stored in said memory means.

5. The paging receiver according to claim 4 wherein said user entry means comprises a switch for selecting at least one of the alternate paging receiver from the predetermined list of addresses.

6. The paging receiver according to claim 4 wherein said user entry means comprises a keypad for selecting any of the alternate paging receivers from the predetermined list of addresses.

7. The paging receiver according to claim 4 wherein said selecting means further comprises means for resetting the selection of the alternate pager to which the message is further intended to be sent after the acknowledge back response is generated.

8. The paging receiver according to claim 1 wherein said means for selecting further comprises user entry means for manually entering an address of the alternate paging receiver to which the message is further intended to be sent.

9. The paging receiver according to claim 8 wherein said user entry means comprises a keypad for entering the address of the alternate paging receiver.

10. The paging receiver according to claim 9 wherein said means for selecting further comprises means for resetting the selection of the alternate pager to which the message is further intended to be sent after the acknowledge back response is generated.

11. A method for providing to a user with a paging receiver having acknowledge back capability, the capability to select any one of a plurality of alternate paging receivers operating in a paging system to which a received message may be further forwarded, said method comprising the steps of:

receiving addresses and associated messages that are directed to the paging receiver and transmitted in the paging system;

selecting by the user the alternate paging receiver to which the received message is further to be sent; and generating the acknowledge back response identifying the selected alternate paging receiver to which the received message is further to be sent.

12. The method according to claim 11 wherein said step of selecting comprises the step of selecting the alternate paging receiver from a predetermined list of addresses of alternate paging receivers stored in the paging receiver.

13. The method according to claim 12 wherein said step of selecting further comprises the step of resetting the selection of the alternate paging receiver to which the message is further intended to be sent after the acknowledge back response is generated.

14. The method according to claim 11 wherein said step of selecting further comprises the step of manually entering an address of the alternate paging receiver to which the message is further intended to be sent.

15. The method according to claim 14 wherein said step of selecting further comprises the step of resetting the selection of the alternate paging receiver to which the message is further intended to be sent after the acknowledge back response is generated.

16. Paging terminal apparatus, for use with paging receivers having acknowledge back capability, wherein a user of such paging receivers receiving paging messages may further request the received message also be forwarded to any one of a plurality of paging receivers operating in the system, said terminal apparatus comprising:

means for sending pager addresses and associated messages intended therefor to the paging receivers said paging receivers each having means for transmitting an acknowledge back response including the identification of an alternate paging receiver to which the message is further to be sent;

receiving means, for receiving the transmitted acknowledge back response; and means, responsive to the received acknowledge back response, for sending the message to the selected alternate paging receiver identified with the acknowledge back response, whereby the alternate paging receiver selected for further receiving the received message is determined from the identification information transmitted with the acknowledge back response.

* * * * *